United States Patent
Zoppas et al.

(10) Patent No.: US 9,186,818 B2
(45) Date of Patent: Nov. 17, 2015

(54) HEATING DEVICE FOR A PREFORM MADE OF THERMOPLASTIC MATERIAL

(75) Inventors: Matteo Zoppas, Conegliano (IT); Alberto Armellin, Vittorio Veneto (IT); Sandro Serra, Oderzo (IT)

(73) Assignee: S.I.P.A. SOCIETA' INDUSTRIALIZZAZIONE PROGETTAZIONE AUTOMAZIONE S.P.A., Vittorio Veneto (IT)

( * ) Notice: Subject to any disclaimer, the term of this patent is extended or adjusted under 35 U.S.C. 154(b) by 303 days.

(21) Appl. No.: 13/878,437

(22) PCT Filed: Oct. 12, 2011

(86) PCT No.: PCT/IB2011/054502
§ 371 (c)(1),
(2), (4) Date: Apr. 9, 2013

(87) PCT Pub. No.: WO2012/049635
PCT Pub. Date: Apr. 19, 2012

(65) Prior Publication Data
US 2013/0189385 A1   Jul. 25, 2013

(30) Foreign Application Priority Data
Oct. 12, 2010 (IT) .............................. RM2010A0535

(51) Int. Cl.
*B29B 13/02* (2006.01)
*B29C 49/64* (2006.01)
*B29C 35/08* (2006.01)

(52) U.S. Cl.
CPC .............. *B29B 13/02* (2013.01); *B29B 13/024* (2013.01); *B29C 49/6445* (2013.01); *B29C 2035/0811* (2013.01)

(58) Field of Classification Search
CPC .. B29B 13/02; B29B 13/024; B29C 49/6445; B29C 2035/0811
USPC .......................................................... 425/526
See application file for complete search history.

(56) References Cited

U.S. PATENT DOCUMENTS 3,947,180 A * 3/1976 Neumaier ...................... 425/533
4,443,679 A * 4/1984 Balordi .......................... 219/618
4,606,723 A * 8/1986 Pasternicki .................... 432/124

(Continued)

FOREIGN PATENT DOCUMENTS

EP   0 849 067 A1   6/1998
JP   63 207629 A    8/1988

(Continued)

*Primary Examiner* — Yogendra Gupta
*Assistant Examiner* — Emmanuel S Luk
(74) *Attorney, Agent, or Firm* — Davis, Malm & D'Agostine, PC

(57) ABSTRACT

Heating device for preforms, capable of accurate and highly localized heating of the preforms before the blow molding step of the process of producing bottles or containers from plastic materials. This device comprises two or more heating modules (11-16), each comprising a through opening (100) in the direction of the thickness of the heating module and a heating element (5) positioned in the vicinity of the through opening. The modules (11-16) are assembled such that the through openings (100) are aligned reciprocally with each other to define a conditioning cavity for the heating device (1). Each heating module (11-16) comprises induction means (2).

17 Claims, 5 Drawing Sheets

(56) References Cited

U.S. PATENT DOCUMENTS

| | | | |
|---|---|---|---|
| 4,734,118 A * | 3/1988 | Marechal et al. | 65/102 |
| 5,017,126 A * | 5/1991 | Yamada et al. | 425/526 |
| 5,656,057 A * | 8/1997 | Brown et al. | 65/384 |
| 5,920,677 A * | 7/1999 | Emmer et al. | 392/419 |
| 5,942,259 A * | 8/1999 | Uchiyama et al. | 425/174.8 R |
| 6,361,301 B1 * | 3/2002 | Scaglotti et al. | 425/174.4 |
| 6,632,087 B1 * | 10/2003 | Armellin et al. | 432/202 |
| 6,839,652 B2 * | 1/2005 | Shelby et al. | 702/130 |
| 7,448,866 B2 * | 11/2008 | Doudement | 432/202 |
| 8,983,281 B2 * | 3/2015 | Schoenberger et al. | 392/417 |
| 2003/0183622 A1 * | 10/2003 | Okada et al. | 219/635 |
| 2004/0016749 A1 * | 1/2004 | Miyazawa et al. | 219/553 |
| 2006/0186582 A1 * | 8/2006 | Scheid | 264/535 |
| 2007/0148272 A1 * | 6/2007 | Doudement | 425/174.4 |
| 2008/0102148 A1 * | 5/2008 | Evrard | 425/174.4 |
| 2008/0217326 A1 * | 9/2008 | Armellin et al. | 219/659 |
| 2008/0305203 A1 * | 12/2008 | Plantamura | 425/174.4 |
| 2009/0115104 A1 * | 5/2009 | Anbarasu et al. | 264/319 |
| 2009/0250666 A1 * | 10/2009 | Saga | 252/512 |
| 2010/0065552 A1 * | 3/2010 | Matsen et al. | 219/671 |
| 2010/0200560 A1 * | 8/2010 | Deyerl et al. | 219/385 |
| 2010/0201040 A1 * | 8/2010 | Guichard et al. | 264/403 |
| 2010/0225029 A1 * | 9/2010 | Senn | 264/492 |
| 2010/0295217 A1 * | 11/2010 | Forsthoevel et al. | 264/458 |
| 2011/0006462 A1 * | 1/2011 | Cochran et al. | 264/454 |
| 2011/0132892 A1 * | 6/2011 | Winzinger et al. | 219/420 |
| 2011/0135288 A1 * | 6/2011 | Winzinger et al. | 392/416 |
| 2011/0260370 A1 * | 10/2011 | Lize | 264/481 |
| 2012/0104662 A1 * | 5/2012 | Miller et al. | 264/500 |
| 2012/0128809 A1 * | 5/2012 | Guichard et al. | 425/40 |
| 2012/0267357 A1 * | 10/2012 | Monteix | 219/411 |
| 2013/0189385 A1 * | 7/2013 | Zoppas et al. | 425/3 |
| 2013/0193622 A1 * | 8/2013 | Feuilloley et al. | 264/458 |
| 2013/0221579 A1 * | 8/2013 | Bellec et al. | 264/458 |
| 2014/0120203 A1 * | 5/2014 | Zacche' | 425/526 |
| 2015/0083737 A1 * | 3/2015 | Iino et al. | 220/675 |

FOREIGN PATENT DOCUMENTS

| | | |
|---|---|---|
| JP | 1 184118 A | 7/1989 |
| JP | 3 290225 A | 12/1991 |
| JP | 4 065216 A | 3/1992 |
| JP | 2006 181756 A | 7/2006 |
| WO | WO 2007 031509 A1 | 3/2007 |

* cited by examiner

HEATING DEVICE FOR A PREFORM MADE OF THERMOPLASTIC MATERIAL

FIELD OF THE INVENTION

The present invention relates to a heating device for a preform, especially suitable for the induction heating of preforms for the production of bottles and other types of thermoplastic containers, in particular PET, by blow moulding.

PRIOR ART

Various types of heating devices for preforms are known, including containers made from thermoplastic materials using the technique of blow moulding or stretch blow moulding, used in particular in the production of PET containers.

Known heating devices include a cable housing intended to accommodate a preform, and a heating element inserted into the perimeter of the cable housing that produces the heat necessary to bring the preform material to a sufficiently high temperature to perform the blowing stage.

The preforms from which are formed containers such as jars and bottles of various shapes, including areas intended to be expanded during the blowing in the suitable blow moulds, and areas that do not expand, such as the neck, which is already in its final form at the time of the injection moulding. For this reason, the heating element must be inserted into the heating cavity in a suitable specific position in, relation to the type of preform to be processed.

An example of a heating device is described in WO2007031509, wherein the heating of predefined areas of the preform is performed by releasing heat by means of magnetic induction.

Since the heating cavity in this known solution is defined in relation to the preform to be heated and the final shape of the container to be produced, when it is necessary to change the preform to be heated or to be conditioned, it becomes necessary to replace the entire heating device, with a considerable cost and loss of time.

There is therefore a perceived need for a heating device for a preform that allows the above-mentioned drawbacks to be overcome.

SUMMARY OF THE INVENTION

The purpose of the present invention is to provide a heating device for a preform arranged so as to obtain, with great precision, a predetermined temperature distribution in different zones along the longitudinal extent of the body of the preform, before the blow molding step of the production process of plastic bottles or containers suited to resolving the above problems.

Another purpose of the present invention is to create a heating device for a preform that is constructed in an innovative arrangement, thus permitting better performance compared to known solutions, by reducing the energy required to reach the design temperatures in the heater element.

Finally, a further purpose is to provide a heating device with simple and easily replaceable radiating components.

An object of the present invention is to provide a heating device for a preform which comprises at least one thermal conditioning cavity, having a longitudinal axis configured to contain, at least in part, the body of a preform, in which there are provided two or more separate heating modules, each heating module having a thickness in the direction of the longitudinal axis, said two or more heating modules being arranged in relation to each other so that their through openings are aligned with each other along the longitudinal axis and together define the conditioning cavity; in which each heating module comprises induction means suited to inducing, on applying a current to them, a magnetic flux on a respective heat transfer element, so as to transmit a predetermined amount of heat by irradiation to a corresponding portion of the preform, when the preform is inserted in the conditioning cavity; and in which electrical power supply means are provided, independent of each other, to power the individual induction means of said two or more heating modules in order to adjust the temperature of the individual portions of the preform corresponding to the respective heat transfer elements, which are separated from each other.

The physical separation between one heat transfer element and the next permits the achievement, with notably greater precision, of a predetermined temperature distribution in the corresponding portions of the preform along the longitudinal extent.

Thanks to the solution according to the heating device of the invention, after producing a batch of containers having a certain shape, when it becomes necessary to heat preforms of a different length or diameter in order to produce containers having a different shape and/or volume than the previous ones, it is sufficient to replace, or add or remove, one or more heating modules within each thermal conditioning cavity of the device.

In addition, the conditioning cavity of the preforms is defined by the heater rings of the respective heating modules and, since the latter are interchangeable, the cross-section of the conditioning cavity can therefore be varied in relation to the cross-section of the preform to be conditioned.

Advantageously, the heating device according to the invention is modular in each of its parts, thus allowing its easier adaptation to different shapes of preforms, and making it possible to optimise the heating of the preforms in relation to the portions of the preform that require greater and more precise heating.

The dependent claims describe preferred embodiments of the invention, forming an integral part of the present description.

BRIEF DESCRIPTION OF THE FIGURES

Further characteristics as well as further advantages of the present invention will become apparent from the following detailed description of the preferred, but not exclusive, embodiments of a heating device for a preform, as shown in the annexed drawings, which are supplied by way of non-limiting example, wherein.

The same numbers and the same reference letters in the figures identify the same elements or components.

DETAILED DESCRIPTION OF A PREFERRED EMBODIMENT OF THE INVENTION

Figure 1:
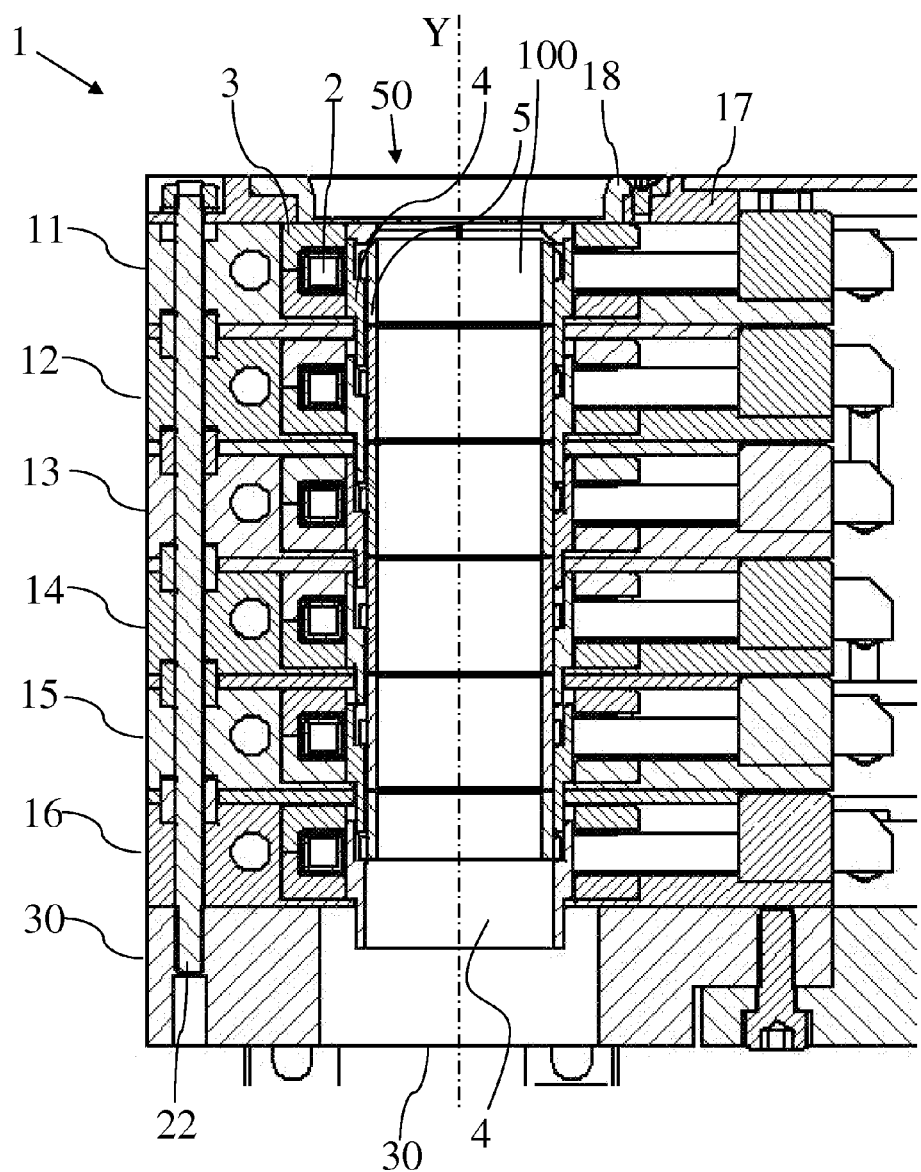
FIG. 1 shows an axial section of the heating device according to the invention.

A heating device for a preform 1 according to the present invention, with reference to the figures, comprises at least one thermal conditioning cavity 50 defining a longitudinal axis Y, configured to accommodate the tubular body of a preform

200. Said cavity, which is substantially cylindrical in shape, is defined by two or more separate heating modules stacked vertically on each other. The figures illustrate a variant design of the heating device 1, which comprises six heating modules 11, 12, 13, 14, 15 and 16 and a bottom 30 stacked one on top of another. Devices with more or less than six modules are possible, with characteristics wholly similar to those described below for the embodiment with six modules.

Each of the heating modules has two spatial dimensions that are larger than a third dimension defining the thickness or height of the module, i.e. the dimension along the Y axis. Each heating module also comprises a through opening 100 in the direction of the thickness and a heating element, in the form of a heating ring 5, which delimits said through opening 100.

For the fixation of the vertically stacked heating modules, two or more fixation elements 22 are provided which pass through the device longitudinally.

By way of example, the fixation can be formed by through holes in the direction of the thickness of the heating modules through which are inserted suitable studs or rods that keep the six heating modules 11, 12, 13, 14, 15 and 16 stacked together, and a bottom 30 defining a base of said conditioning cavity.

Figure 2:
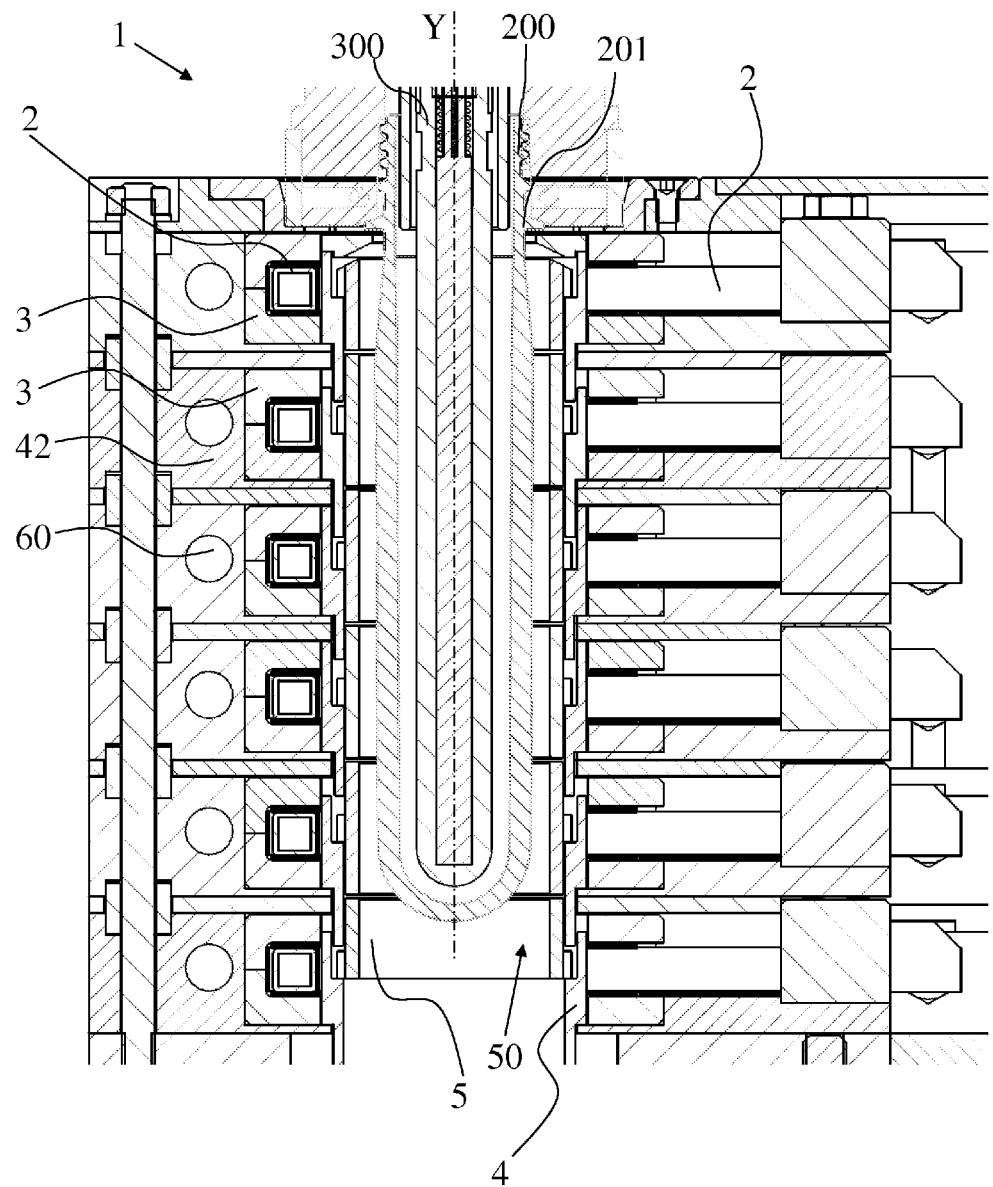
FIG. 2 shows the same section of FIG. 1 in an operation step with a preform inserted.
Figure 3:
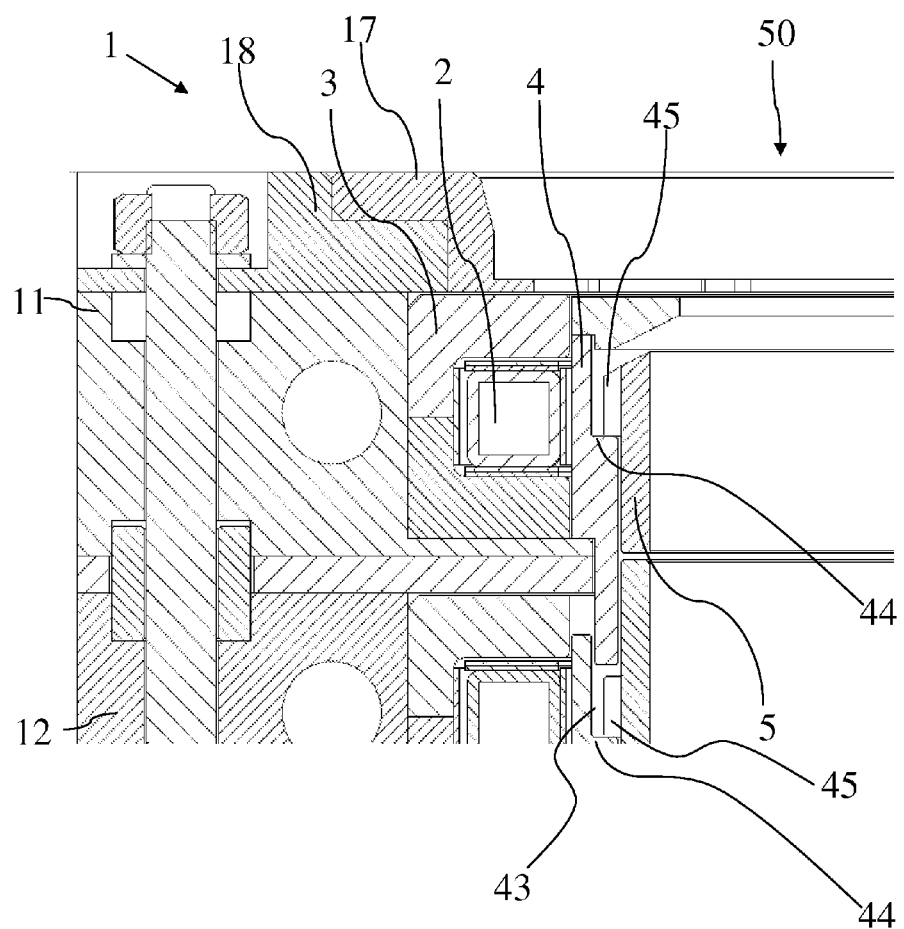
FIG. 3 shows an enlarged detail of a part of FIG. 1.

A plurality of heating modules and its associated bottom, combined coaxially, together with an associated support structure, define the heating device 1. Since the openings 100 of each heating module are aligned coaxially to each other along said axis Y, a conditioning cavity 50 is defined that is substantially cylindrical on the inside, and suited to accommodating a preform to be heated. See, for example, FIG. 2, which shows a preform inserted into the conditioning cavity 50 of the heating device 1, in a particular step of the heating process.

Each of the heating modules 11, 12, 13, 14, 15 and 16 comprises a respective annular induction coil indicated by the reference 2. It is understood that each heating module is similar in all of its particulars to other modules constituting the device 1 and, therefore, the description of the particulars of one module can be applied to all of the other modules that constitute the device according to the invention.

Each induction coil 2, also called, for simplicity, an inductor can be powered and controlled independently of the coils of the other modules of the device 1. In a preferred embodiment, means are provided for adjusting the flux of current through each induction coil 2.

The device 1 also comprises a top module 17 also having a through opening in the direction of the thickness and concentric to the openings 100 of the heating modules below. The top module 17 is provided on its inside with a perforated flange 18 centered with its associated opening in relation to the axis Y.

The module 17 defines the support for the collar or ring 201 of a preform 200 during the thermal conditioning stage of the preform within the cavity 50. In this way, the preform body 200 is held suspended inside the conditioning cavity of the heating device 1.

The top module 17 is also assembled with the heating modules and the bottom, preferably by means of the studs or rods 22 or equivalent fixation elements.

When a preform with a different shape must be processed, the module 17 with the perforated flange 18 can be replaced, if necessary, to adapt it to the shape and the diameter of the ring of the preform, while the number of heating modules can be varied in relation to shape of the preform, for example to the diameter, body length, wall thickness, etc. Advantageously, the heating device 1 can thus be adapted to a large number of preforms having different shapes and volumes.

According to a preferred variant of the invention, each heating module produces heat through magnetic induction, and comprises:
an induction coil 2,
a possible flux concentrator 3, preferably made from magnetodielectric material,
an insulating ring 4,
a heater ring 5.

Each induction coil 2, which is preferably made of copper, crosses the body of the respective heating module and has, inside the device, an arrangement that is preferably, but not necessarily, circular in order to surround the respective portion of the conditioning cavity 50. The passage of electric current into the inductor 2 produces a magnetic field whose flux is advantageously conveyed, also by means of the use of the respective flux concentrator 3, on the respective heater ring 5, made for example from alloys with high electrical resistivity and resistance to high temperatures, for example Ni—Cr—Fe alloys. This allows the heater ring 5 to reach a predetermined temperature, preferably above 800° C. The heater ring 5 must be able to reach the temperature that will generate a transmission of heat, by radiation, to the corresponding zone of the preform 200 for a predetermined time, which results in the proper heating of the preforms in all of their parts, according to a pattern predefined in the design phase of the container, which allows a blowing operation without defects or breakage of the walls of the final container.

During the blowing step of the preform 200, pressures are used for the blowing fluid in excess of 40 atmospheres, and an uneven heating of the preform, not compliant with the planned distribution of temperatures in the different parts of the preform, could easily lead to tensions in the walls that the thermoplastic material could not tolerate.

With particular reference to the heater ring 5, it can have different shapes. It is preferred that it can also be interchangeable, such that it can be replaced when there are changes in the external diameter of the preform 200, without necessarily having to also replace the inductor 2, which then can be used for different ranges of diameters. In this way, the diameter of the conditioning cavity 50 can be varied according to the specific requirements, but without necessarily replacing all of the components of the heating device 1.

According to the preferred embodiment of the heating device 1 shown in the figures, each heater ring 5 is surrounded by a respective insulating ring 4, arranged so as provide thermal shielding for the induction coil 2 that in turn surrounds the ring 4.

The insulating rings 4 are made of an insulating material with low thermal conductivity, such as a ceramic material.

The heater rings 5 have a substantially flattened hollow cylindrical shape, i.e. having the height of the cylinder (dimension along the axis Y) equal to or less than the diameter of the cylinder base. The heater rings 5 are equipped on their outer side surface with an annular protrusion or circular collar 45 to hold the ring 5 in position in the assembly stage. The heater rings are preferably but not necessarily, made of Inconel alloy or Ni—Cr alloys with high thermal resistance, or Fe—Cr—Al alloys.

Each insulating ring 4, viewed along a section plane lying on the Y-axis of the conditioning cavity 50, has a substantially Z-shaped section in which:
a first upper part of the section is rectilinear and parallel to the Y-axis and shields the induction coil 2,
and a second and lower rectilinear section of the zone, parallel to the axis Y and arranged more internally in relation to the first section, protrudes downwards beyond the thickness of the relevant heating module, for example, the module 11, until it partially overlaps with an end part of the first upper section of the ring 4 of the adjacent heating module below, for example, the heating module 12.

Figure 4:
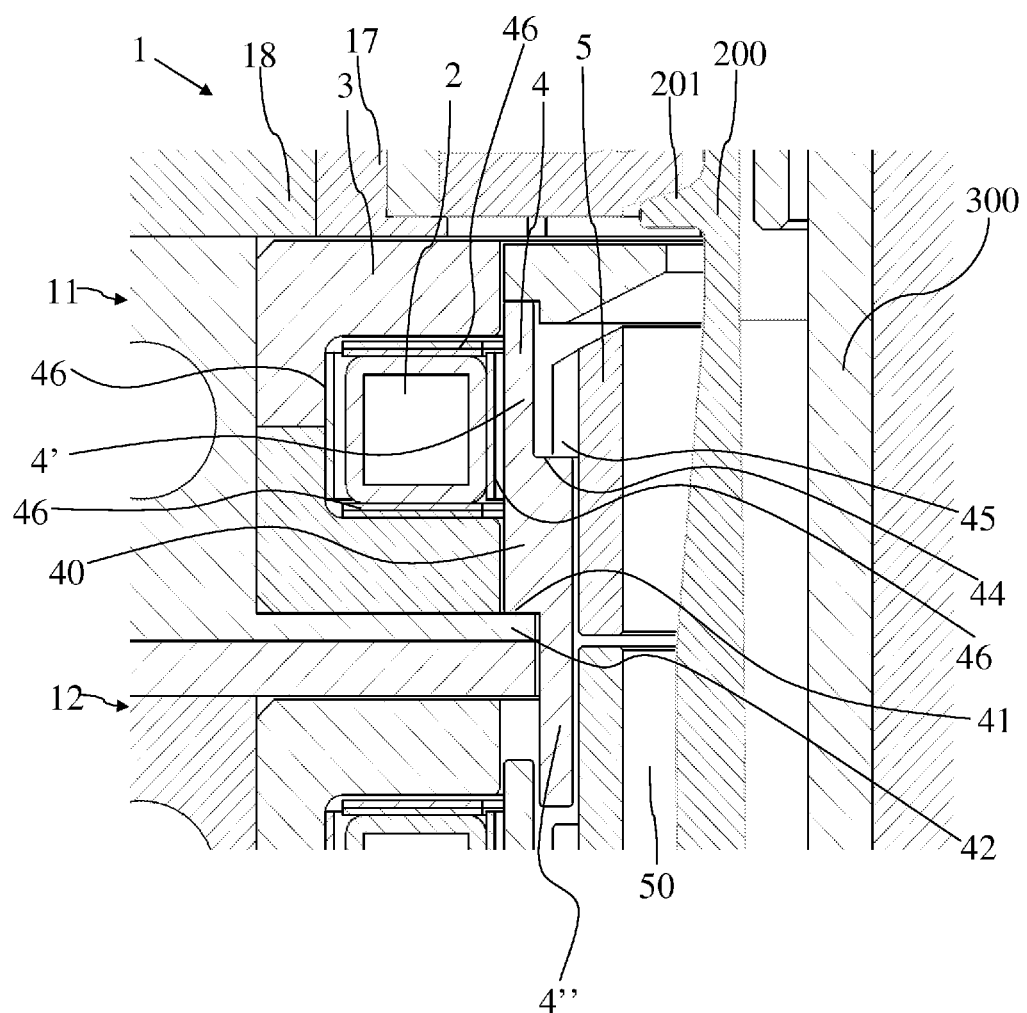
FIG. 4 shows an enlarged detail of a part of FIG. 2.
Figure 5:
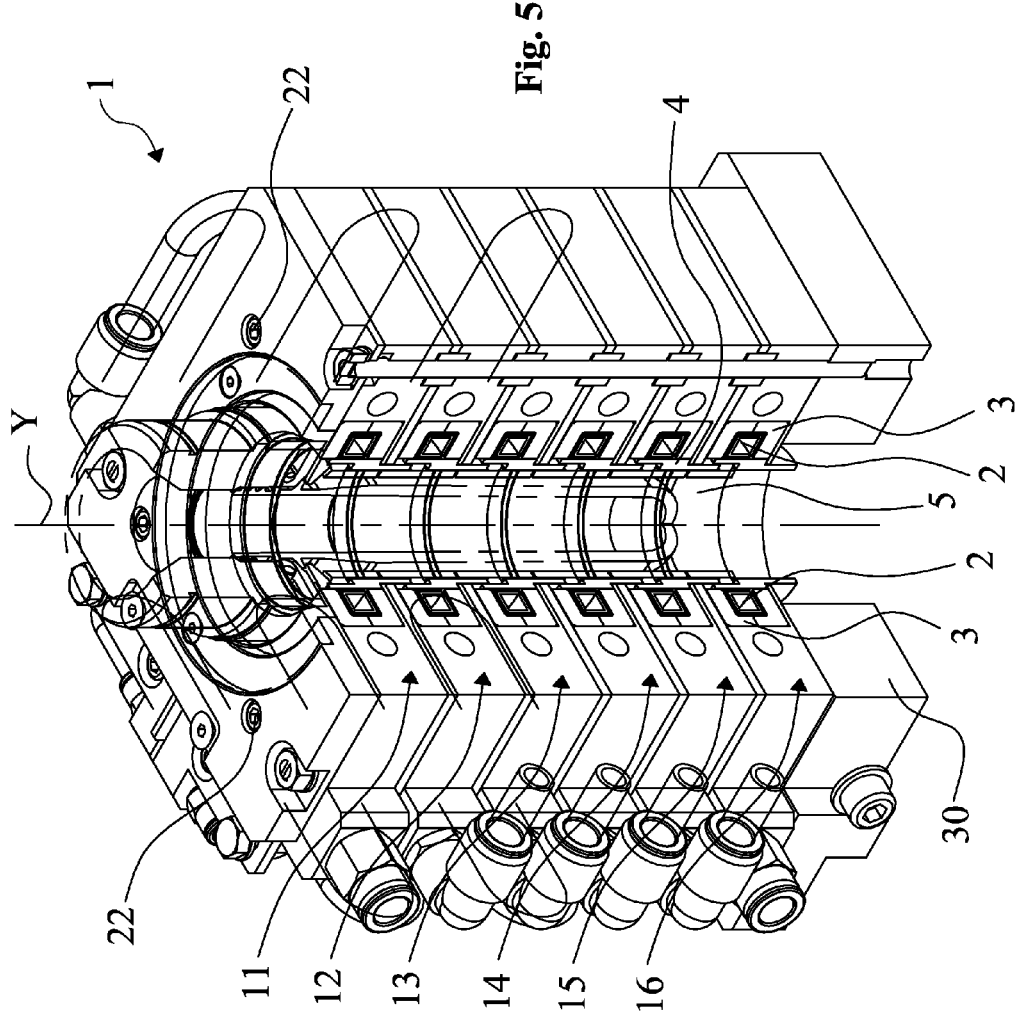
FIG. 5 shows an axonometric view of a section of the device according to the invention.

Therefore, the insulating rings 4 of the heating modules comprise an upper annular portion 4' and a lower annular portion 4" connected by a central annular portion 40 (FIG. 4).

The upper annular portion 4' has both its internal and external diameters greater than the respective internal and external diameters of the lower annular portion 4". The central annular portion 40 has an external diameter equal to the external diameter of the upper annular portion 4', and has an internal diameter equal to the internal diameter of the lower annular portion 4". Therefore, each ring 4, in the assembly step, is supported with the shoulder 41, between the lower annular portion 4" and the central annular portion 40, on one end of the support base 42 of the respective heating module.

The partial overlapping of the lower annular portion 4" of the ring 4 of a heating module 11 with the upper annular portion 4' of the ring 4 of the adjacent heating module 12 below advantageously defines an annular groove or recess 43.

The other heating modules below, as can be seen from the figures, are shaped in a similar way to the first two upper modules 11 and 12 just described.

The annular groove 43, formed by the partial overlapping of the two parts of two adjacent insulating rings 4, constitute a seat for the annular projection or the circular collar 45 of a heater ring 5, which is inserted into said groove in the step of assembling the device.

The heater rings 5 of the adjacent modules define a sheath covering the conditioning cavity 50.

Optionally, a magnetic flux concentrator 3 can be provided for each induction coil 2. The concentrator 3 has an annular shape arranged so as to accommodate on its inside at least the circular portion of the respective induction coil 2. In the example shown in the figures, the concentrator 3 has a cross-section that is substantially C-shaped, and the cavity of the C shape accommodates the part of the induction coil 2 contained within the respective module.

The concentrator 3 can be made from a single block or from a set of two or more blocks of preferably magnetodielectric material. In the example of the figures, the concentrator 3 consists of two separate blocks which together define the arrangement of the C-shaped section.

Advantageously, in each heating module, the induction coil 2 is externally coated with annular strips 46 of insulating material, such as mica, to increase its electrical safety. Such annular strips 46 are arranged around the entire external surface of the induction coil 2, both between the coil 2 and the concentrator 3 and between the coil 2 and the insulating ring 4.

The support base 42 of each heating module has a recess that accommodates the respective concentrator 3 and induction coil 2. One end of the support base 42 supports the external shoulder 41 of the insulating ring 4 that, with the central portion 40 and the upper portion 4', screens the induction coil 2. The internal shoulder 44 in turn supports the annular projection 45 of the heater ring 5.

This innovative construction arrangement permits better performance than known solutions, by reducing the energy required to reach the design temperatures of the heating elements, i.e. in the heater rings 5.

Advantageously, in addition, the configuration described is simple to assemble and disassemble so as to make it easy to adapt the heating device to a new preform shape. During the assembly step, for example, a first ring 4 is supported on a support base of a respective heating module, and then a first heater ring 5 is inserted with its annular projection 45 supported on the shoulder 44, between the upper annular portion 4' and the central annular portion 40, of the first ring 4, and then a second ring 4 is inserted, supported on a support base of the heating module above so as to define the annular groove 43 that accommodates the annular projection 45 of the first heater ring, and so on.

In addition, the lower annular portion 4" of the insulation ring 4, which protrudes downwards, allows for easier reciprocal centering between the heating modules.

According to a preferred variant of the invention, the induction coils 2 are connected to one another in series, resulting in a uniform heating of the device 1, but other means of connection are possible depending on the different heating requirements. Advantageously, in fact, a further preferred embodiment provides for individual mutually independent means of supplying electrical current for each induction coil 2.

Advantageously, each induction coil does not heat the corresponding portion of the preform directly, but rather brings it up to temperature by means of a concentration of the magnetic flux generated by passing an electrical current in the coil in the heater ring 5 which raises its temperature. Consequently, the heater ring 5 in turn warms the PET, or other thermoplastic material, of which the preform is made, by means of radiation and convection.

According to other preferred variants of the invention, the induction coils 2 may be replaced by other devices, such as resistive cartridges and similar components.

Moreover, while the embodiment illustrated in the figures shows that the thickness of all of the heating modules 11-16 appears to be the same, other embodiments are possible in which each heating module can have a different thickness depending on the specific requirements, e.g. for heat distribution along the preform body.

A further advantage of the device according to the invention is the fact that channels 60 are provided for the passage of cooling fluid, such as water, within the support base 42 of each heating module.

According to another aspect of the invention, the conditioning device may comprise a retractable heating element 300 suitable for being inserted into the preform 200, through the respective opening in the neck, when the preforms are inserted into the conditioning cavity 50.

The retractable heating element 300, inserted in the preform, heats it from the inside, while the heater ring 5 of the different modules heats it from the outside.

Thanks to the retractable heating element 300, it is possible to greatly reduce the heating times of preforms having particularly thick walls.

Preferably, the outer surface of the retractable heating element 300 has a geometric profile that is complementary to the shape of the preform cavity, so as to ensure that a constant distance from it is maintained.

Advantageously, the heating times can be reduced to one quarter for each preform, with the same thickness and size of the preform.

The methods for heating the retractable heating element 300 may be different, including, for example, electrical resistors, induction systems, etc.

The elements and characteristics illustrated in the different preferred embodiments may be combined without, however, going beyond the scope of protection of this application.

The invention claimed is:

1. A heating device for a preform made of thermoplastic material, comprising at least one thermal conditioning cavity having a longitudinal axis (Y) and adapted to contain, at least in part, a body of the preform, wherein there are provided two or more separate heating modules, each heating module having a respective through opening and a thickness in the direction of the longitudinal axis (Y), said two or more heating modules being arranged with respect to one another so that the respective through openings are reciprocally aligned along the longitudinal axis (Y) and together define the thermal conditioning cavity, wherein each heating module comprises a respective heater ring positioned inside the heating module, separate from each other and delimiting the respective through opening, a respective induction coil arranged externally around the heater ring, configured to induce, on the passage of current in it, a magnetic flux on the heater ring, so as to transmit a predetermined amount of heat by irradiation to a corresponding portion of the preform when the preform is inserted into the thermal conditioning cavity, and wherein there are provided means of electrical power supply, independent of each other, to independently supply the induction coils of said two or more heating modules so as to adjust the temperature of individual portions of the preform corresponding to the respective heater ring.

2. The heating device according to claim 1, further comprising a top module, arranged above said two or more heating modules, having a through axial opening concentric with the thermal conditioning cavity, and a perforated flange centered with the longitudinal axis (Y) defining a resting surface for a preform ring.

3. The device according to claim 2, comprising a cavity bottom connected below to said two or more heating modules, thus defining a bottom of said thermal conditioning cavity.

4. The device according to claim 1, wherein each heating module is provided with a respective insulating ring to electrically shield the respective induction coil and the respective heater ring.

5. The device according to claim 4, wherein the insulating ring of each heating module, according to a section plane laying on an axis (Y) of the thermal conditioning cavity, has a Z-shaped section, with a first segment of the section parallel to the axis (Y) which shields the induction coil and with a second segment which is straight, protrude downwards, and partially overlaps the insulating ring of an adjacent heating module.

6. The device according to claim 4, wherein the insulating ring of each heating module is supported with an its own external shoulder at one end of a support base of the respective heating module.

7. The device according to claim 6, wherein the heater ring of each heating module is supported on an internal shoulder of the insulating ring.

8. The device according to claim 7, wherein the heater ring has a hollow cylindrical shape and is provided on its external side surface with an annular projection supported on said internal shoulder and contained within an annular recess, said annular recess being defined by a partial overlapping of a lower annular portion of the insulating ring of a first heating module of said two or more heating modules with an upper annular portion of another insulating ring of a second heating module of said two or more heating modules under said first heating module.

9. The device according to claim 8, wherein a magnetic flux concentrator is provided for each induction coil, arranged so as to accommodate the respective induction coil at least partially inside it.

10. The device according to claim 9, wherein in each heating module the induction coil is externally covered by annular strips made of an insulating material, preferably arranged either between the induction coil and the magnetic flux concentrator or between the induction coil and the insulating ring.

11. The device according to claim 9, wherein the support base of each heating module has a recess that accommodates the respective magnetic flux concentrator and the induction coil.

12. The device according to claim 11, further comprising a retractable heating element adapted to be inserted into said preform, when inserted into the thermal conditioning cavity, with a movement parallel to said longitudinal axis (Y).

13. The device according to claim 12, wherein said retractable heating element has an outer surface having a geometrical profile complementary to an inner shape of the preform, so as to ensure a constant distance from the latter.

14. The device according to claim 13, wherein said retractable heating element is heated by a resistive cartridge.

15. The device according to claim 4, wherein a magnetic flux concentrator is provided for each induction coil, arranged so as to accommodate the respective induction coil at least partially inside it.

16. The device according to claim 15, wherein in each heating module the induction coil is externally covered by annular strips made of an insulating material, preferably arranged either between the induction coil and the magnetic flux concentrator or between the induction coil and the insulating ring.

17. The device according to claim 5, wherein a magnetic flux concentrator is provided for each induction coil, arranged so as to accommodate the respective induction coil at least partially inside it.

* * * * *